June 12, 1934.   W. D. WILCOX   1,962,418
PROCESS OF OBTAINING A MIXTURE OF HYDROGEN AND NITROGEN IN DETERMINED
PROPORTIONS FROM NATURAL GAS AND SIMILAR HYDROCARBON GASES
Filed Sept. 17, 1928   2 Sheets-Sheet 1

Inventor:
W. D. Wilcox

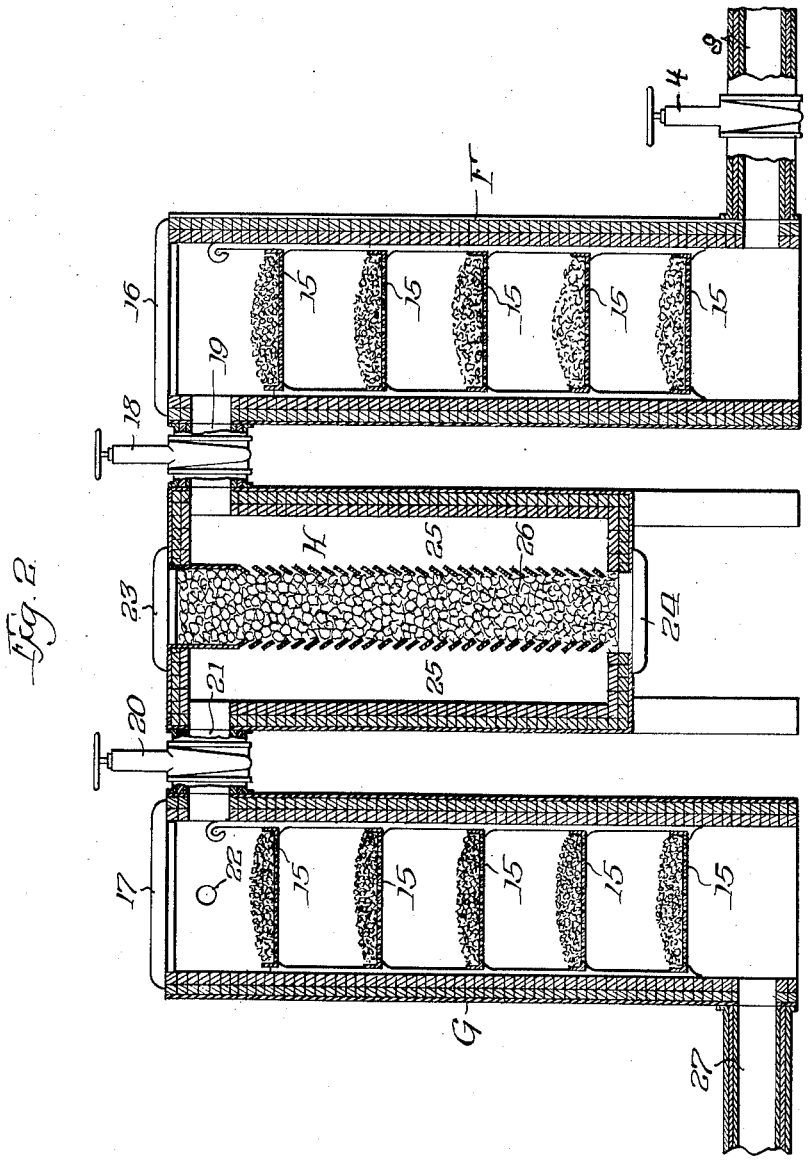

Patented June 12, 1934

1,962,418

UNITED STATES PATENT OFFICE 1,962,418

PROCESS OF OBTAINING A MIXTURE OF HYDROGEN AND NITROGEN IN DETERMINED PROPORTIONS FROM NATURAL GAS AND SIMILAR HYDROCARBON GASES

William D. Wilcox, Idaho Falls, Idaho

Application September 17, 1928, Serial No. 306,578

4 Claims. (Cl. 23—7)

As is well known, there have been developed during recent years a number of uses for hydrogen gas and of greatest importance a process in which hydrogen and nitrogen in the volumetric proportions of three and one are caused by heat and pressure in contact with a catalyst, to unite according to the equation $3H_3+N_2=2NH_3$, forming ammonia. My process is intended particularly to provide an efficient means by which a mixture of hydrogen and nitrogen in the proportions required for the synthesis of ammonia may be obtained from natural gas or from similar hydrocarbon gases derived from coal, petroleum or oil shale.

The process can be more readily understood by reference to the accompanying drawings:

Figure 2 shows a vertical cross section of apparatus used in the conversion of carbon monoxide to dioxide in order to facilitate the elimination of oxides of carbon with a concurrent production of hydrogen through the dissociation of steam.

Figure 1:
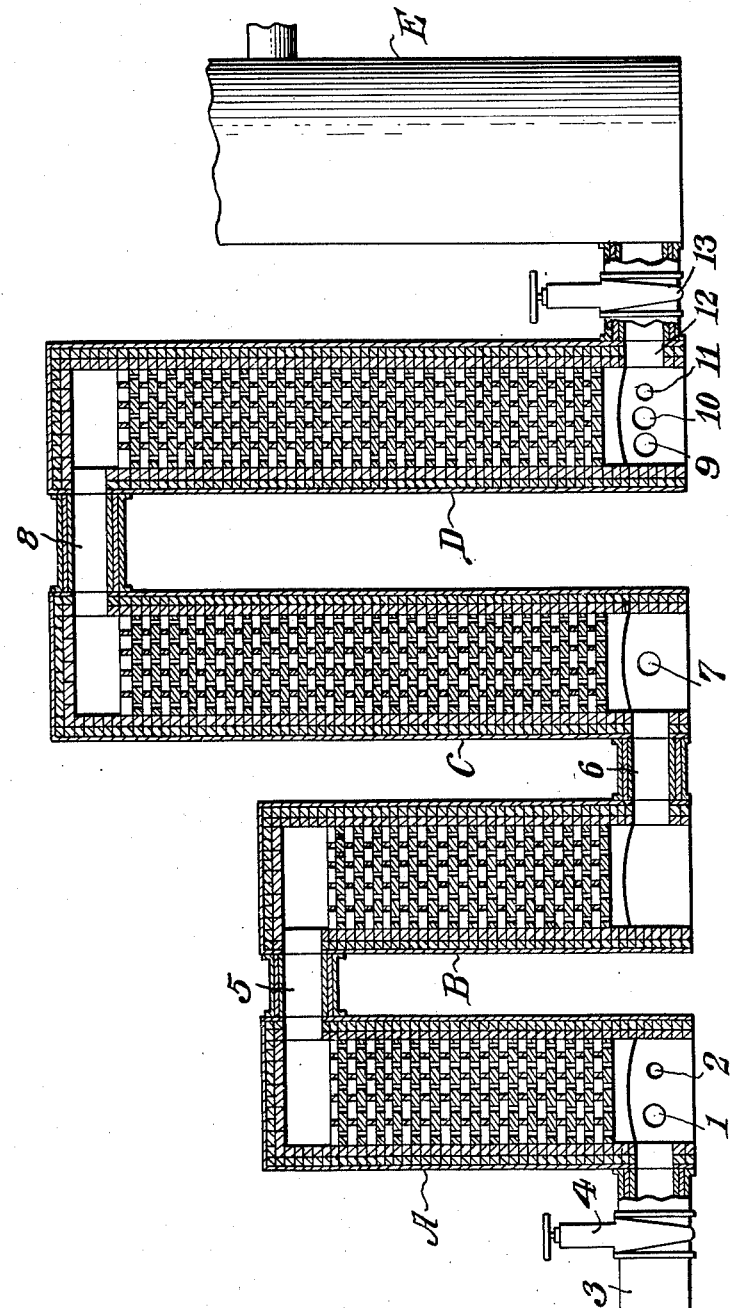
Figure 1 shows a vertical cross section of apparatus used in the dissociation of the hydrocarbon gases.

A, B, C and D are conduits connected in series or which may be regarded as parts of a single conduit.

E is a steam boiler. 1 is an air inlet. 2 is a steam inlet. 3 is an outlet for the conserved gases from the base of A. 4 is a valve closing this outlet. 5 is a passage connecting A and B. 6 is a passage connecting B and C. 7 is an inlet for the admission of combustible gas to the base of C. 8 is a passage connecting C and D. 9 is an inlet for the admission of air to the base of D. 10 is an inlet for the admission of natural gas or similar hydrocarbon gases to the base of D. 11 is a steam inlet.

Means will be provided on these several inlets for supplying pressure and controlling the rate of input and for determining the volumetric rate of admission, together with valves to open and close.

12 is a passage connecting the base of D with the base of steam boiler E. 13 is a valve closing this passage. In Figure 2—3 is the passage or outlet from A also shown in Figure 1. 4 is the valve closing this passage. F and G are conduits. H is an absorption chamber.

15, 15, 15, etc. are perforated trays on which are placed suitable catalytic materials, such as iron oxide, the activity of which has been increased by adding the oxides of some of the rare metals for the purpose of accelerating the reaction which it is desired to bring about.

16 and 17 are lids or doors upon the top of F and G respectively, giving access to their interiors for the purpose of removing the trays and renewing the catalyst.

18 is a valve closing passage 19 which connects F and H. 20 is a valve closing passage 21 which connects H and G. 22 is a steam inlet. 23 is a lid or door permitting the charging of lime into the interior of H.

24 is a door permitting the discharge of spent lime from H.

25—25 are perforated walls enclosing the body of lime within H, but permitting the passage of gases from F through H into G.

27 is an outlet for the withdrawal of the gaseous product from G for further treatment and use.

The conduits A, B, C, D, F, and G will preferably be in cylindrical form, having an outer steel jacket, a lining of insulating material and an inner lining of highly refractory and heat resistant material. A, B, C and D are filled for the most part with checker brick of highly refractory quality closely spaced. H will preferably be of a rectangular form having a length substantially greater than the width shown by the cross section in Figure 2, but I do not limit myself to the particular design or construction shown in the drawings.

*Operation.*—Valve 4 being closed, valve 13 open, air is admitted through 1 and a combustible gas through 7 under such pressures as will insure their flow through the conduits into E and in such proportions that when the combustible gas is ignited there will be a complete combustion within conduits C and D. The combustion products pass through 12 into E where their sensible heat may be utilized to generate the steam employed in the process. Combustion may be continued until the walls and checker brick of C and D are highly heated. The walls and checker brick in the lower part of C must be brought to a temperature substantially in excess of 2100 degrees F. 1 and 7 are now closed. A sufficient volume of steam is admitted through 2 to drive the air and combustion products in the several conduits over into F. Valve 13 is now closed, valve 4 is opened, air is admitted through 9, gas through 10, steam through 11. The volume of air relative to gas will be so limited that the volume of nitrogen in the final product will bear the desired proportion to the hydrogen. Some excess of steam may be introduced above that required to oxidize the excess of carbon in the gas not oxidized by the oxygen admitted through 9. The reactions which occur may be represented by the following equations:

$$2CH_4 + O_2 + 4N_2 = 2CO + 2H_2 + 4N_2 + heat.$$
$$CH_4 + H_2O = CO + 3H_2 - heat.$$

The walls and checker brick are of progressively higher temperatures as we pass from the base of D to the base of C. The gases and vapors admitted to the base of D passing in a direction counter current to the passage of the combustion gases are gradually heated. At some point in the passage, the oxygen admitted at 9 will unite with the gases admitted at 10, causing a partial combustion only with evolution of heat. Later, as the gaseous mixture is exposed to an increased temperature, the undecomposed methane and higher hydrocarbons will be decomposed, the hydrogen remaining as a gas, the carbon being released as a solid. Simultaneously the steam will be decomposed, the hydrogen remaining as a gas, the oxygen uniting with adjacent carbon to form oxides of carbon which at the temperature at which the decomposition of steam occurs will be predominantly monoxide. The dissociation of methane, the most stable of the hydrocarbons, will be practically complete at a temperature in excess of 2100 degrees. The reactions described are predominantly endothermic or heat absorbing and in addition to the absorption of heat required to carry on these reactions the gases pass from C at a high temperature and in passing through B and C to outlet 3, they will impart much of their heat to the walls and checker brick of these conduits. The temperature of C having fallen below the minimum required to bring about a fairly complete decomposition of the hydrocarbons, 9 and 10 will be closed, 11 kept open until a sufficient volume of steam has been admitted to drive the gases which it is desired to conserve through 3 into F. 11 is now closed. Valve 4 is closed. Valve 13 is opened. Air is admitted through 1, combustible gas through 7, and the interior of the conduits reheated as in the first cycle of operation with this difference that the air passing through A and B and coming in contact with the hot walls and checker brick is highly superheated so that the flame temperature of the combustion carried on in C and D is now greatly increased. A high temperature can be created in the walls and checker brick of C and D more quickly and with a less expenditure of fuel gas than was required in the first heating. A and B serve a useful purpose in thus facilitating the creation of an adequate temperature and may also assist by cooling the conserved gases in bringing about some portion of the reversion of CO to $CO_2$ to complete which the apparatus shown in Figure 2 has been provided. Steam inlet 2 will be kept open during the passage of the conserved gases through 3 into F, and sufficient steam added to the gaseous mixture to reduce the temperature of the gases to around 900° F. At this temperature, with an excess of steam and brought in contact with the catalytic material in trays 15—15—15, the following reaction takes place CO plus $H_2O = CO_2$ plus $H_2$. The function of the lime in H is to absorb out a part of the $CO_2$, thus making it possible to carry the oxidation of CO to $CO_2$ more nearly to completion. The reaction occurring in H is CaO plus $CO_2 = CaCO_3$. This is exothermic and has the effect of increasing the temperature of the gases passing into G. Additional steam is admitted through 22 to lower the temperature to perhaps 700° F. A further oxidation of CO to $CO_2$ with production of hydrogen takes place under these conditions by contact with the catalytic material in trays 15—15—15 in G and the final product passing out through 27 will contain only a very small proportion of CO, which may be scrubbed out, if desired, in a later procedure by use of a suitable absorbent. The removal of the carbon dioxide from the gases passing from 27 can readily be accomplished by absorption by water under pressure, by scrubbing with alkaline solutions or, where the ammonia is to be used to produce ammonia carbonate urea or ammonia sulphate by combination with gypsum, may be scrubbed out with a solution of ammonia hydroxide as a step in obtaining the final product. It is proposed to operate at pressures substantially in excess of atmospheric both within the apparatus shown in Figure 1 and Figure 2, but I do not propose to confine myself to a particular pressure or range of pressures. One limitation is placed upon the use of high pressures that the existence of high pressures may retard the with dissociation of the hydrocarbon gases causing an increase in the temperature necessary to bring this about. It is also proposed to employ catalysts in B and A which will promote the reactions desired and cause them to proceed at temperatures below the 2100° F. which is regarded as the lower limit of satisfactory operation, where dependence is placed upon the effect of heat only. I may also find it of advantage to place electrically heated elements in the passage from the base of C into B, but the use of catalysts in A and B or of electrical heating, forms no part of the process on which I desire to obtain allowance of a patent.

What I claim as new is:

1. The process of obtaining a mixture of hydrogen and nitrogen in determined proportions from natural gas and similar hydrocarbon gases, which comprises heating the interior of a conduit to a temperature substantially in excess of 2100° F., then passing a mixture of air, hydrocarbon gases and steam in controlled proportions through the conduit, thus producing hydrogen and oxides of carbon, passing the gases through a regenerator chamber, then adding sufficient steam to reduce the temperature to around 900° F., then passing them successively through an iron oxide catalyst and a chamber containing lime, thus absorbing out a portion of the carbon dioxide, then adding sufficient steam to reduce the temperature to around 700° F., passing them through an iron oxide catalyst, then absorbing out the carbon dioxide substantially as described.

2. The process of obtaining a mixture of nitrogen and hydrogen in controlled proportions from natural gas and similar hydrocarbon gases, which comprises heating the interior of a conduit to a temperature substantially in excess of 2100° F. by maintaining an active combustion therein, then passing a mixture of air, hydrocarbon gases, and steam in controlled proportions through the conduit in a direction reverse to the travel of the combustion gases, thus converting them to hydrogen and oxides of carbon, passing the gases from the conduit through a regenerator chamber, then adding sufficient steam to reduce their temperature to around 900° F., then passing them successively through an iron oxide catalyst and through lime to absorb out a part of the carbon dioxide, then adding sufficient steam to reduce their temperature to around 700° F., passing them through an iron oxide catalyst, absorbing out the carbon dioxide, periodically reheating the interior of the conduit, using air preheated by passage through the regenerator, substantially as described.

3. The process of obtaining a mixture of nitrogen and hydrogen in determined proportions from natural gas and similar hydrocarbon gases, which comprises heating the interior of a conduit having a permeable filling of frefractory material to a temperature in excess of 2000° F. by maintaining an active combustion therein, then passing through the conduit in a direction counter current to the direction of travel of the combustion gases through the conduit hydrocarbon gases together with air in such volume as will supply the desired proportion of nitrogen and steam in a volume only slightly greater than sufficient to oxidize that portion of the carbon in the hydrocarbons to monoxide as can not be so oxidized by the oxygen of the air, adding to the issuing gas an excess of steam, reducing the temperature, passing the gas through a suitable catalyst to convert the carbon monoxide to carbon dioxide, and absorbing out the carbon dioxide.

4. The process of obtaining a mixture of nitrogen and hydrogen in determined proportions from natural gas and similar hydrocarbon gases, which comprises heating the interior of a conduit having a permeable filling of refractory material to a temperature in excess of 2000° F. by maintaining an active combustion therein, then passing through the conduit in a direction counter current to the direction of travel of the combustion gases through the conduit a mixture of hydrocarbon gases with a volume of air sufficient to supply the desired proportion of nitrogen and steam slightly more than sufficient to oxidize to carbon monoxide such portion of the carbon in the hydrocarbon gases as can not be so oxidized by the oxygen of the air, passing the gases issuing from the conduit through a regenerator having a permeable filling of refractory material, then adding an excess of steam, reducing the temperature, passing the gases through a suitable catalyst to convert the carbon monoxide to dioxide, absorbing out the carbon dioxide. Periodically reheating the interior of the conduit, preheating the air which supports combustion by passing it through the regenerator in a direction counter current to the direction of travel of the heated gas.

WILLIAM D. WILCOX.